(12) United States Patent
Church et al.

(10) Patent No.: US 10,977,299 B2
(45) Date of Patent: Apr. 13, 2021

(54) SYSTEMS AND METHODS FOR CONSOLIDATING RECORDED CONTENT (71) Applicant: Baidu USA, LLC, Sunnyvale, CA (US)

(72) Inventors: Kenneth Ward Church, Dobbs Ferry, NY (US); Zheng Zu, San Jose, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 16/254,413

(22) Filed: Jan. 22, 2019

(65) Prior Publication Data
US 2019/0370283 A1 Dec. 5, 2019

Related U.S. Application Data (60) Provisional application No. 62/678,131, filed on May 30, 2018.

(51) Int. Cl.
G06F 16/483 (2019.01)
G06F 16/45 (2019.01)
G10L 15/26 (2006.01)
G06F 16/683 (2019.01)
G06N 20/00 (2019.01)
G06N 3/08 (2006.01)
G10L 17/04 (2013.01)
G10L 17/00 (2013.01)

(52) U.S. Cl.
CPC ............ *G06F 16/483* (2019.01); *G06F 16/45* (2019.01); *G06F 16/685* (2019.01); *G06N 3/08* (2013.01); *G06N 20/00* (2019.01); *G10L 15/26* (2013.01); *G10L 17/00* (2013.01); *G10L 17/04* (2013.01)

(58) Field of Classification Search
CPC ................................................... G06F 16/483
USPC ........................................................ 386/241
See application file for complete search history.

(56) References Cited

U.S. PATENT DOCUMENTS

2009/0025039 A1* 1/2009 Bronstein .......... G06K 9/00751
725/60
2016/0321029 A1* 11/2016 Zhang .................... G06F 3/165

OTHER PUBLICATIONS

"MyLifeBits",[online], [Retrieved May 12, 2020]. Retrieved from Internet <URL: https://www.microsoft.com/en-us/research/project/mylifebits/> (3pgs).

(Continued)

*Primary Examiner* — Eileen M Adams
*Assistant Examiner* — Daniel T Tekle
(74) *Attorney, Agent, or Firm* — North Weber & Baugh LLP (57) ABSTRACT

It is desirable to have audio and/or video systems and processing tools that can automatically record audio/video and analyze such recordings to capture material that may be relevant to a user. In one or more embodiments disclosed herein, a recording may be condensed by using one or more tools, including but not limited to, converting speech to text and searching for relevant content, keywords, and the like; detecting and sorting speakers and/or content (e.g., events in a conversation); removing non-substantive content (e.g., silences and other irrelevant content); adjusting the audio for increased playback speed; using prosodic and other indicia in the audio to identify areas of interest; performing diarization; using pseudo-random or random sample to select content; and other methods to extract information to provide a summary or representation of recorded content for review by a user.

20 Claims, 8 Drawing Sheets (56) References Cited

OTHER PUBLICATIONS

D. Roy, "The birth of a word,"[online], [Retrieved Mar. 19, 2020]. Video available at <URL: https://www.ted.com/talks/deb_roy_the_birth_of_a_word> (3pgs).

"Welcome to the AMI Corpus",[online], [Retrieved Mar. 19, 2020]. Retrieved from Internet <URL: http://groups.inf.ed.ac.uk/ami/corpus/> (1pg).

Lileikyt et al.,"Effective Keyword Search for Low-Resourced Conversational Speech," in ICASSP, 2017. [online], [Retrieved Mar. 19, 2020]. Retrieved from Internet <URL: https://www.researchgate.net/publication/312213519_Effective_keyword_search_for_low-resourced_conversational_speech> (5pgs).

\* cited by examiner

SYSTEMS AND METHODS FOR CONSOLIDATING RECORDED CONTENT

CROSS REFERENCE TO RELATED PATENT APPLICATIONS

The present application claims priority benefit, under 35 U.S.C. § 119(e), to and commonly-assigned U.S. Patent Application No. 62/678,131, filed on May 30, 2018, entitled "Systems and Methods for Consolidating Recorded Content," and listing Kenneth Ward Church and Zheng Zu as inventors, which application is herein incorporated by reference as to its entire content. Each reference mentioned in this patent document is incorporated by reference herein in its entirety.

TECHNICAL FIELD

The present disclosure relates generally to systems and methods for multimedia processing. More particularly, the present disclosure relates to systems and methods for automatically consolidating content from a recording such as an audio or video recording.

BACKGROUND

Many parents work and live far away from their homes and their children. For example, in some countries, children are raised by grandparents in one town and parents live in a remote town somewhere else in the country. Such living arrangements make it very difficult for the middle generations to spend quality time with their growing children. The problem is exacerbated by the fact that many parents cannot afford to visit their children more than a few times a year, if at all.

Parents' lack of face-to-face interaction is alleviated to some degree by the advent of video conferencing tools that have become ubiquitous in recent years and have replaced daily phone calls as a means for parents to keep up with events at home. In addition, the continuous increase in recording and storage capacity of mobile devices enables grandparents to make audio and video recordings of infants, toddlers, and teenagers. This allows parents to get a view into their children's daily lives and provides parents at least some background information to talk about when calling home for bedtime. While such tools somewhat improve the sought-after social interaction between parents and children, a short video conference cannot capture many of the pieces of information and valuable moments that a child experiences throughout a whole day.

Therefore, it would be desirable to have audio and video processing tools that can automatically record audio/video of a child and analyze rather lengthy recordings to capture content that may be relevant to the child's parent to increase the speed and depth of the understanding of the recorded information.

SUMMARY

Presented are methods and systems for producing a digest of a file, e.g., a multimedia file. One method comprises receiving a recording of a first duration that is made using a number of recording devices that capture real-time events occurring within a recording capture area of the recording device(s), receiving a set of user-selectable content-related parameters, applying automated content identifiers to identify and label portions of the recording with a content type, in which some portions of the recording are labeled as non-substantive content, generating a digest file of the recording having a digest duration shorter than a target duration that is less than the first duration, by performing steps comprising: not including in the digest file portions of the recording labeled as non-substantive content; using some of the user-selectable content-related parameters from the set of user-selectable content-related parameters and some of the labels of content type to assign a priority to some of the portions of the recording; responsive to the digest duration not being less than the target duration, if the digest file includes all portions of the recording having a top priority, using a secondary parameter to select portions of the recording having a top priority to include in the digest file so that the digest file has a digest duration less than the target duration; and responsive to the digest duration being less than the target duration, supplying the digest file to a recipient. Using priorities may comprise sampling clusters of speech content to generate a sub-sample of clusters to be included in the digest file.

Not including in the digest file portions of the recording labeled as non-substantive content may comprise removing non-substantive content from the recording, wherein removing comprises removing, at a time the recording is made, some of the recording that is deemed silence based on identifying signals as being below a threshold value. The secondary parameter may comprise a duration, a user-identified nested priority, or a parameter for randomly selecting content, and the at least one secondary parameter may be selected from the set of user-selectable content-related parameters. The selected portions of the recording that have a top priority may be subportions that have been selected from one or more of the portions of the recording that have been assigned a priority.

An automated content identifier may use a parameter related to at least one of energy, pitch, duration, rhythm, speed, volume, or timing of words when identifying and labeling at least some portions of the recording as having a content type, e.g., emotional speech, associated with at least one of a speaker, a location, silence, or an environmental parameter. The parameter may comprise a prosodic marker used to label some portions of the substantive content. The prosodic marker may be derived from, e.g., a time-domain waveform or a frequency-domain spectrogram, which has been derived from a time-domain waveform.

A speech-to-text engine may convert, e.g., in a post-processing step, the digest file into text to enable an identification of the labeled portions of the recording via a keyword search in the text. The speech-to-text engine may create a transcript of the recording that indicates speaker turns by the two or more speakers. In response to determining that the substantive content comprises speech by two or more speakers, markers may be assigned to portions of the substantive content, indicating speaker turns that identify speech associated with each of the speakers. Supplying the digest file to the recipient may comprise adjusting a pitch when the digest file is played back at an increased speed. Machine learning techniques may be applied to the recording to train a speech model to identify the portions of the recording, e.g., using a diarization module to identify speech associated with the number of speakers.

One method may comprise receiving a recording comprising audio signals, video signals, or both; identifying and labeling portions of the recording that comprise types of speech that are associated with events associated with a speaker, a location, or an environmental parameter; grouping the labeled portions of the recording into clusters of speech that each may be associated with events; based on a set of criteria, applying priorities to clusters of speech; and using the priorities to generate a digest file of the recording comprising clusters of speech; and providing the digest file to a recipient.

Labeling portions of the recording may comprise, in response to a difference between two or more of markers exceeding a threshold, tagging a location in a portion of the recording with a marker that identifies a location in the portion of the recording as substantive content.

A suitable system implementation may use a processor and a non-transitory computer-readable medium comprising instructions that, when executed by the processor, cause the steps in the above-mentioned method(s) to be performed.

Although features and advantages are generally described in this summary section and the following detailed description section in the context of embodiments, it shall be understood that the scope of the present disclosure should not be limited to these particular embodiments. Many additional features and advantages, as well as additional embodiments, will be apparent to one of ordinary skill in the art in view of the drawings, specification, and claims hereof.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

FIGURE ("FIG.") 1 is an illustrative flowchart of a general process for consolidating contents of a recording, in accordance with various embodiments of the present disclosure.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

Furthermore, it shall be noted that many embodiments described herein are given in the context of audio recordings, but one skilled in the art shall recognize that the teachings of the present disclosure are not limited to audio applications and may equally be used to create and consolidate video content and may also be extended to include classification of objects or people in the video, motion, location, time, and other parameters.

A. Overview

In this document "speech" and any form of "utterance" are used interchangeably. Similarly, the terms "digest" and "consolidated content" may be used interchangeably and refer to any form of reduced or edited content, e.g., content that may be used to create a summary of recorded speech. As used herein, the term "keyword" comprises wake-up words, utterances, and other data that may be extracted from sound waves and other audio and video sources recognized by one of skilled in the art. "Recording" refers to any audio and/or video file or service.

Figure 1:
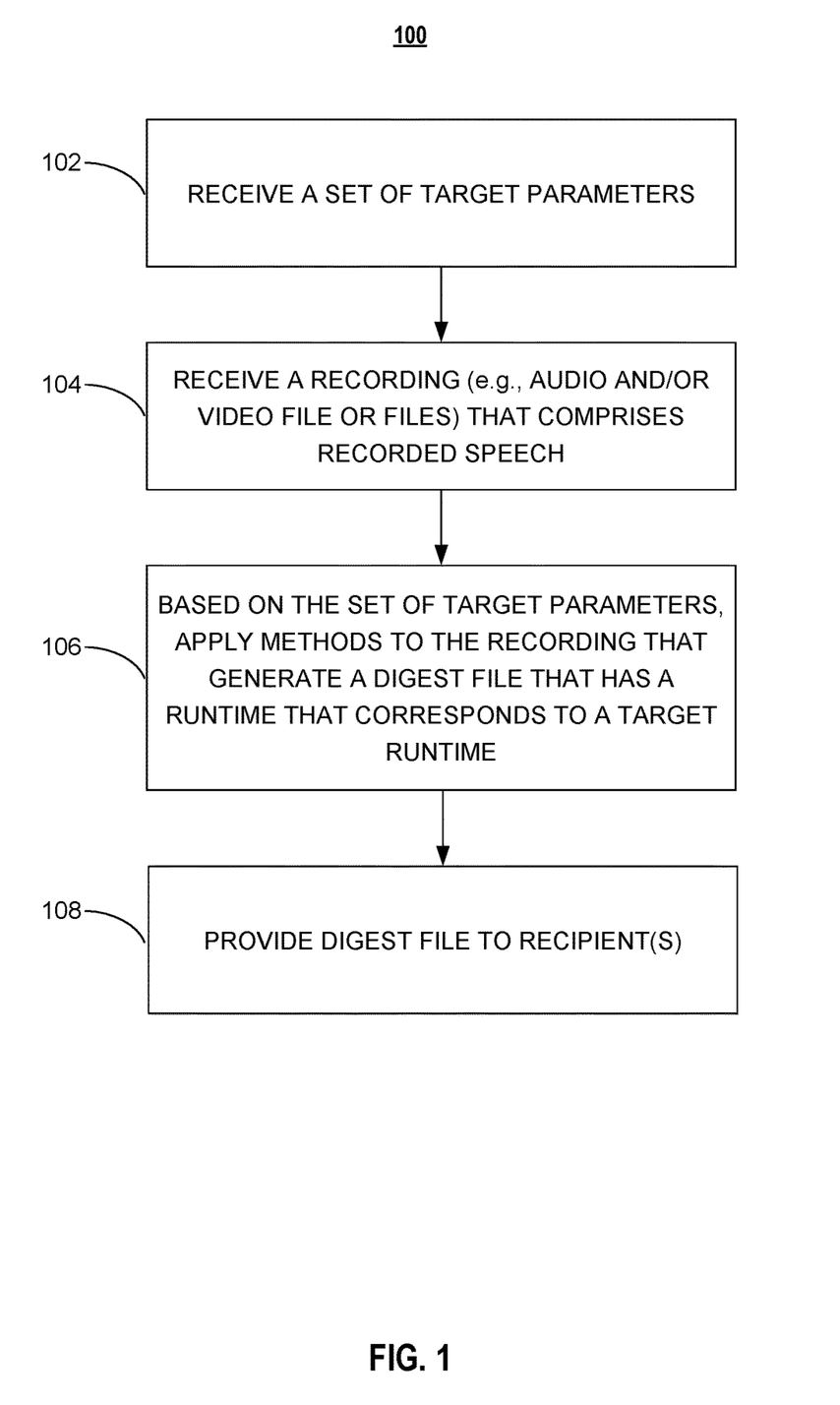

FIG. 1 is an illustrative flowchart of a general process for consolidating contents of a recording in accordance with various embodiments of the present disclosure. In embodiments, consolidating process 100 starts when a set of target parameters is received (102), e.g., by a user, or are preset by the system. Target parameters may comprise user-selectable content-related parameters or not related to content, e.g., a runtime that may be measured in units of minutes.

In embodiments, a recording, such as an audio or video file, that comprises recorded speech is received (104). Based on the set of target parameters, one or more methods may be applied (106) to the recording to generate a digest file that has a reduced content and a runtime that matches the target runtime. Finally, the digest file may be provided (108) to one or more recipients. It is understood that the digest file may be made available in any desired format. Reducing content by removing non-substantive content and certain substantive content, advantageously, aids in avoiding unnecessary transmission and processing of data and, thus, increases data throughput in a network and reduces data storage requirements.

Figure 2:
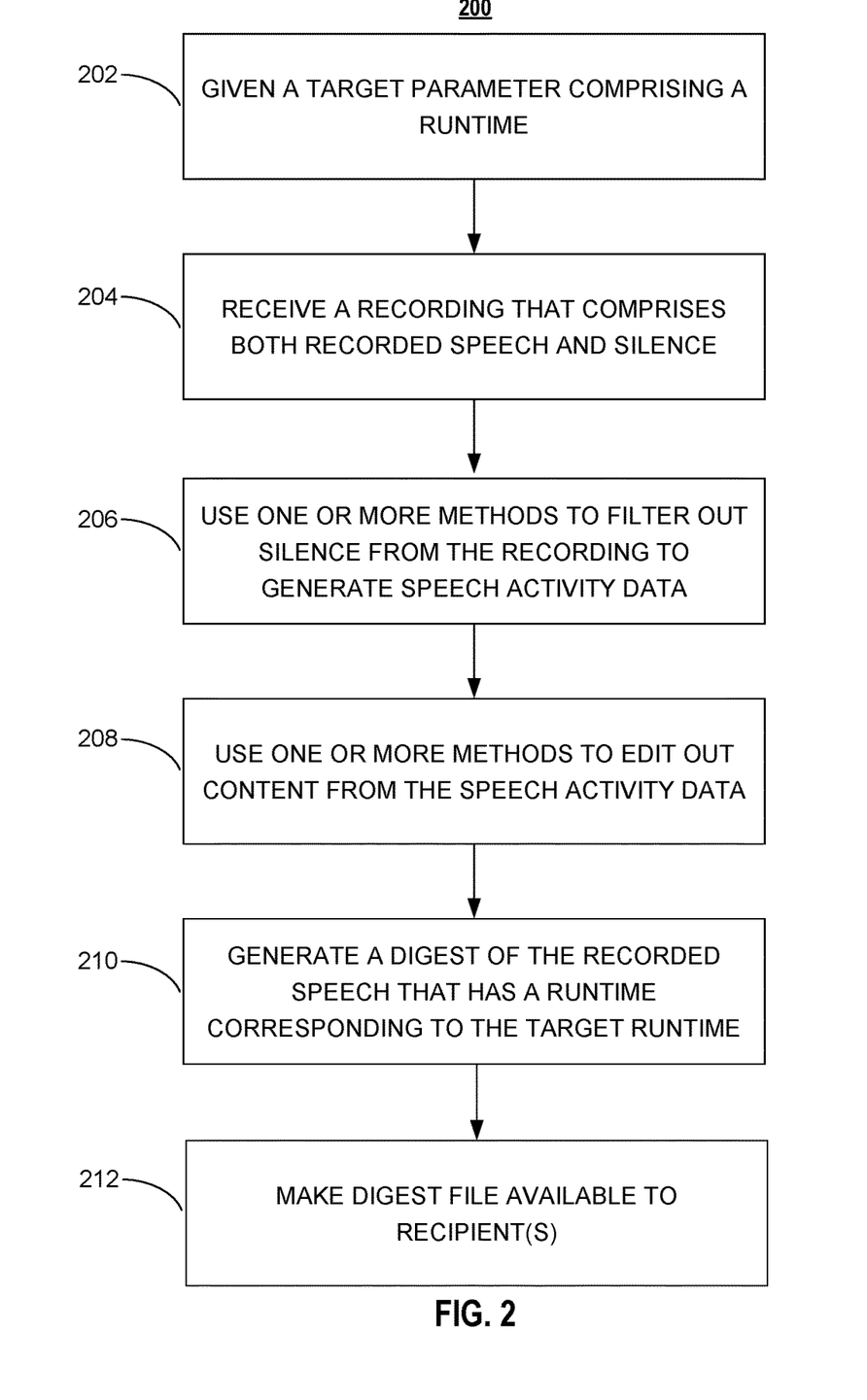
FIG. 2 is an illustrative flowchart of another process for consolidating contents of a recording, in accordance with various embodiments of the present disclosure.

In a manner similar to the method in FIG. 1, the method in FIG. 2, which illustrates another process for consolidating contents of a recording according to various embodiments of the present disclosure, comprises receiving a set of target parameters (202) and a recording (204) that comprises recorded speech and silence or non-speech. In embodiments, based on at least a runtime target parameter, one or more methods are applied (206) to filter out sections of silence from the recording to generate speech activity data. In embodiments, one or more methods may be used to edit out (208) content from the speech activity data to generate a digest of the recorded speech that has a runtime that corresponds to the target runtime. The digest file may be made available (212) to any number of recipients. In embodiments, the generation of a digest that has reduced content comprises the removal of content that, e.g., based on user input, is deemed non-substantive, such that that the generated digest comprises mainly substantive content.

It is understood that the disclosed methods for removing non-substantive content (discussed in Section B below) and substantive content (discussed in Section C below) may be employed individually or in combination. In embodiments, after a first method for removing non-substantive content is applied to a recording, a runtime may be estimated or calculated and compared to the target runtime, such that a second method for removing non-substantive content is applied if the target runtime has not been reached yet. In embodiments, this process may be continued until all available methods for removing non-substantive content are exhausted before applying a first method for removing substantive content. Again, after applying each such method, the runtime may be estimated or calculated and a subsequent method for removing substantive content may be applied if the runtime fails to meet the target runtime, e.g., until each available method has been applied at least once.

B. Non-Substantive Content Removal

Figure 7:
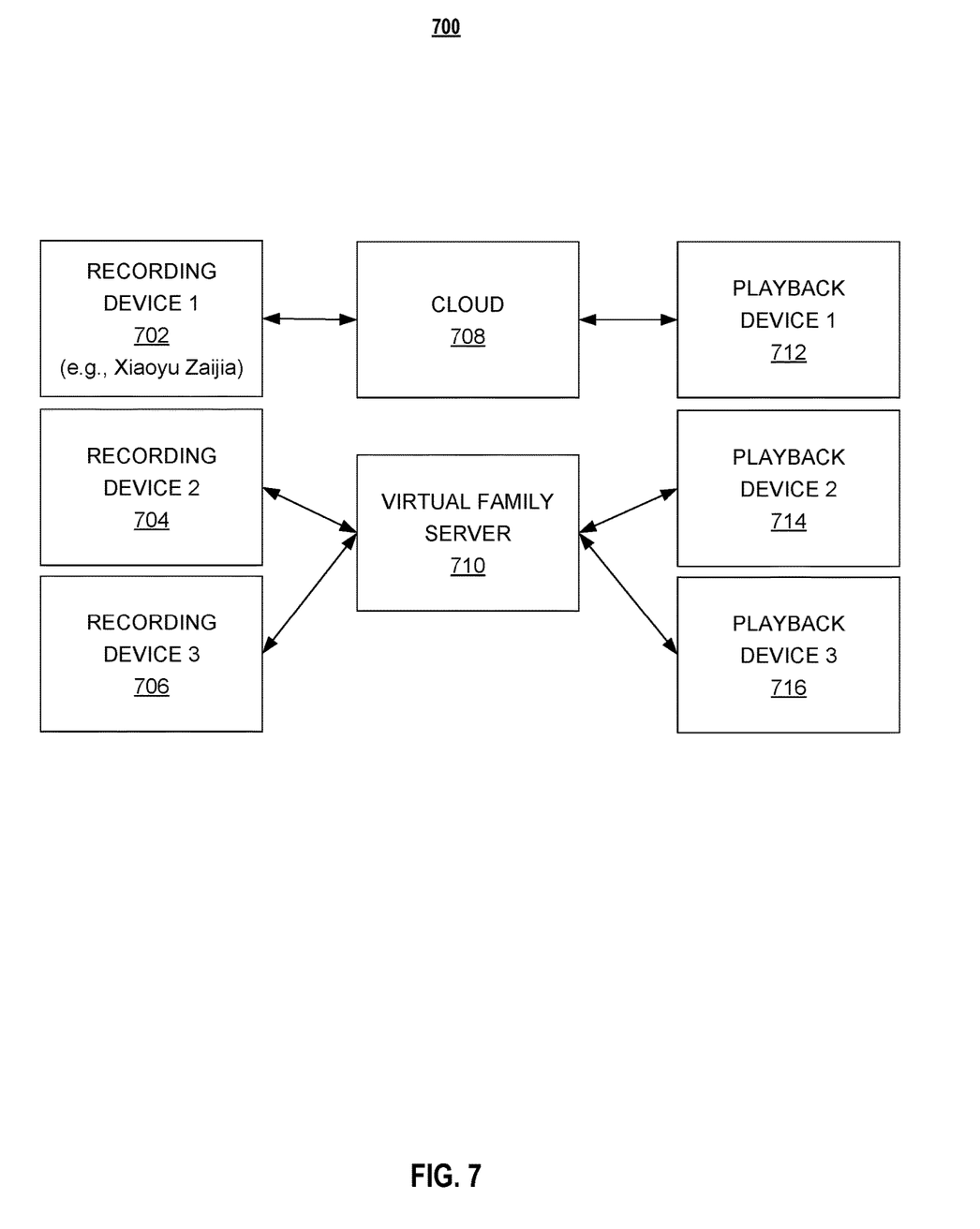
FIG. 7 illustrates an exemplary system for consolidating the contents of a recording according to various embodiments of the present disclosure.

It is noted that any of the methods presented in this document may be performed by various components of a system, such as a system shown in FIG. 7. As noted with respect to FIG. 2, in embodiments, such a system may prefer to reduce non-substantive content prior to removing substantive content when generating a digest. Below are some methods for removing non-substantive content in accordance with various embodiments of the present disclosure.

1. Removing Silence

In this document, silence generally refers to non-substantive content that comprises non-speech data, i.e., data that represents no active speech. In embodiments, silence more specifically refers to low-energy signals recorded over a certain time period, e.g., a duration of 500 milliseconds. In general, energy of a signal may be defined as the area under the square of the magnitude of a signal or, in the discrete domain, as the sum of the squared moduli.

In embodiments, silence may be identified and filtered out directly at the time of recording, e.g., by a recording device that has audio/video recording capabilities (e.g., a smart phone or security camera), such that non-speech segments of a recording can be dropped or filtered out as a pre-process to consolidating substantive content. In embodiments, non-speech segments may be detected as low energy events and may be eliminated, e.g., by a processing system that, in embodiments, may be located remotely from the recording device (e.g., cloud computing system 708 and/or virtual family server 710 in FIG. 7). In embodiments, the processing system may detect background noise, such as fan noise, and categorize and label such noise as non-speech or silence, such that a recording that contains fan noise but no speech may be removed as non-substantive content. It is noted that any number and combination of speech activity detection (SAD) or voice activity detection methods (VAD) used in speech known in the art, e.g., in coding and speech recognition applications, may be employed to detect the presence or absence of human speech to remove silence.

Figure 3:
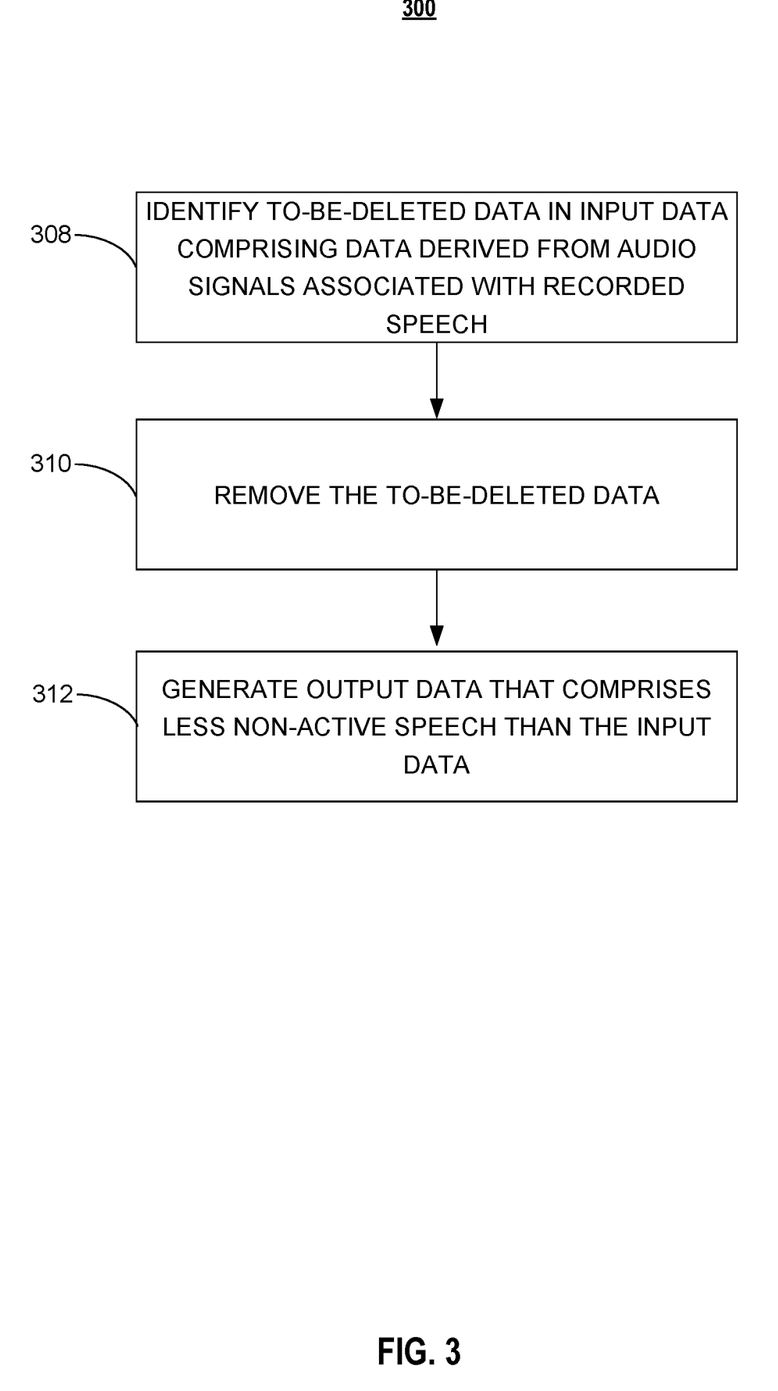
FIG. 3 is a flowchart of an illustrative process for removing data from the contents of a recording, in accordance with various embodiments of the present disclosure.

FIG. 3 is a flowchart of an illustrative process for filtering out silence from the contents of a recording in accordance with various embodiments of the present disclosure. In embodiments, the process for filtering out silence 300 begins when to-be-deleted data is identified (302) within input data that comprises data that has been derived from audio signals associated with recorded speech. The to-be-deleted data may comprise events that have been identified as removable non-substantive content. The to-be-deleted content is then removed (304), and output data that comprises less non-active speech content than the input data may be generated (306).

In embodiments, identified sections of a recording may be flagged for immediate or later removal. It is understood that not recording certain events, such as events occurring at night time, in effect, acts the same as removing data that comprises no speech activity.

In embodiments, silence may be identified and filtered out from a recording based on a set of target parameters, as will be discussed next, e.g., to generate an intermediate result, such as an intermediate digest comprising speech that may be further consolidated using one or more methods described in greater detail below.

2. Target Parameters for Removing Silence

In embodiments, one or more of the methods presented herein may be designed to receive any number of phonetic (e.g., pitch, spectral tilt) and other speech variables and non-phonetic parameters (e.g., a runtime), such as user-selected target parameters, that may define an event or a sound within a recording. For example, certain sounds such as thunder, which otherwise may be automatically discarded as being deemed non-active speech or "silence," may be selected for inclusion in a consolidated recording. Other parameters may comprise measured or calculated signals that may serve as trigger signals that help distinguish between speech and non-speech events. Such trigger signals may comprise, e.g., measured intensity of an acoustic signal, such as the amplitude of a spectral signal obtained from a speaker's voice. It is understood that signals and sounds are not necessarily limited to audible sounds.

In embodiments, target parameters may be automated content identifiers that may be created by automatically identifying, within a recording, and tagging or labeling portions of a recording with at least one content type, such as certain sounds corresponding to events that a system or a user may select to be included in or excluded from a recording, e.g., when creating a digest file. It is understood that such selection may be user and/or content specific. For example, a user may request to include humming noises made by an infant while opting to exclude from a digest file such type of content that may be labeled as non-substantive "silence" or background noise, e.g., if such noises are produced by a teenager while doing homework.

It shall be noted that although embodiments of the present disclosure are discussed mainly in the context of removing silence and certain substantive content to generate a digest or digest file, one of skill in the will appreciate that the teachings of the present disclosure can equally be applied to identify and select substantive content for inclusion in a digest.

C. Substantive Content Removal/Consolidation

In embodiments, various methods may be used to filter or edit out content from a recording comprising speech activity in order to generate a digest of recorded speech. Like the recording, the digest may exist in any data format and may be used to generate, e.g., a digest file that has a runtime corresponding to a desired target runtime. In embodiments, the digest file may be generated based on input by a user, e.g., based on user-selected parameters, to increase the efficiency of extracting from the recording information that is relevant to the user.

1. Target Parameters for Removing Substantive Content

As previously mentioned, methods presented herein may be designed to receive any number of parameters, such as user-selected target parameters that may define an event or a sound in a recording. In embodiments, in order to directly or indirectly remove certain substantive content, a user may select recording times and durations, keywords that may be used as wake-up words to initiate a recording or flag certain substantive content for removal or non-removal, and any number of other user preferences, e.g., parameters that may be associated with certain content types, such as a speaker, a time, a location, an environmental parameter, and the like, that may be used to identify to-be-removed content or content to be kept.

2. Generating a Transcript from the Recording

In embodiments, a speech-to-text converter may be used to generate a transcript from an audio or video recording. It is noted that both raw and filtered material that has had sections of silence already removed from the recording may serve as input to a speech-to-text converter that converts some or all of the speech to text.

Figure 4:
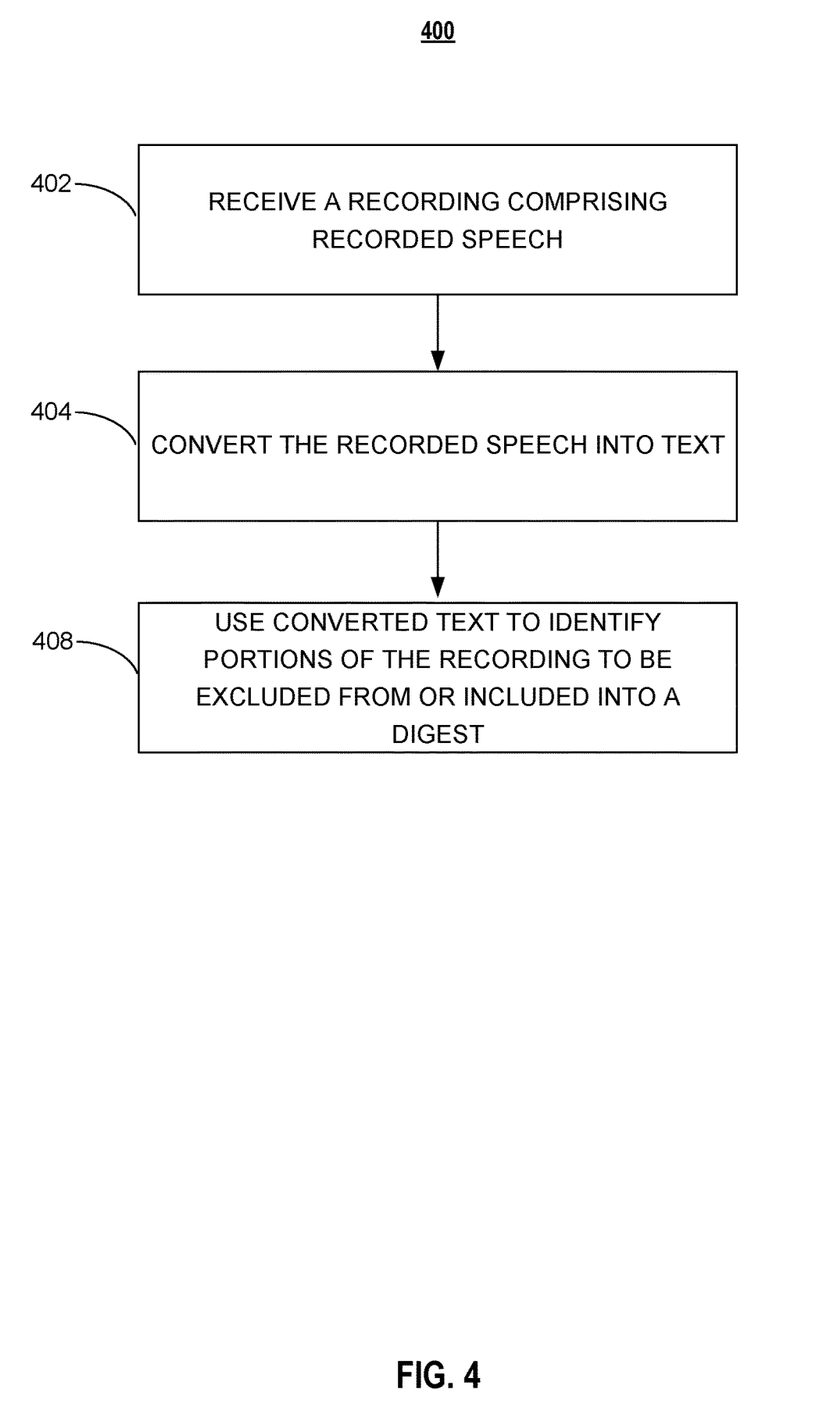
FIG. 4 is a flowchart of an illustrative process for using converted speech to identify portions of a recording that are to be included in and/or excluded from a digest, according to various embodiments of the present disclosure.

FIG. 4 is a flowchart of an illustrative process for using converted speech to identify portions of a recording that are to be included in a digest, according to various embodiments of the present disclosure. In embodiments, process 400 starts when an audio or video file that comprises recorded speech is received (402), e.g., by a commercially available speech recognition software. In embodiments, the recorded speech may be analyzed based on a number of spectral characteristics of the speech, e.g., as derived from time-domain waveforms or by examining frequency-domain spectrograms that may be derived from such waveforms. In embodiments, based on the analysis, a speech may be converted (404) to text, e.g., to generate a transcript. In embodiments, the transcript may be used to identify portions of the recording to be excluded from the digest and/or to identify portions of the recording to be included in the digest. In embodiments, a transcript that comprises text that has been flagged for removal may be provided to one or more users. Embodiments of speech-to-text systems that may be used are described in the commonly-owned applications: U.S. patent application Ser. No. 14/735,002, filed on Jun. 25, 2015, entitled "SYSTEMS AND METHODS FOR SPEECH TRANSCRIPTION;" U.S. patent application Ser. No. 15/358,102, filed on Nov. 21, 2016, entitled "END-TO-END SPEECH RECOGNITION;" U.S. patent application Ser. No. 15/358,083, filed on Nov. 21, 2016, entitled "DEPLOYED END-TO-END SPEECH RECOGNITION;" and U.S. patent application Ser. No. 15/884,239, filed on Jan. 30, 2018, entitled "SYSTEMS AND METHODS FOR PRINCIPLED BIAS REDUCTION IN PRODUCTION SPEECH MODELS," each of which is incorporated by reference herein in its entirety.

In embodiments, the transcript indicating to-be-removed text may be used to generate speech, e.g., to reduce the amount of video data that otherwise may have to be stored. It is noted that any existing speech-to-text and text-to-speech software, e.g., Deep Voice by Baidu (embodiments of text-to-speech systems that may be used are described in the commonly-owned applications: U.S. patent application Ser. No. 15/882,926, filed on Jan. 29, 2018, entitled "SYSTEMS AND METHODS FOR REAL-TIME NEURAL TEXT-TO-SPEECH," and U.S. patent application Ser. No. 15/974,397, filed on May 8, 2018, entitled "SYSTEMS AND METHODS FOR MULTI-SPEAKER NEURAL TEXT-TO-SPEECH," each of which is incorporated by reference herein in its entirety) and application programming interfaces (APIs), such as Watson by IBM® or Quickstart by Google, may be used to accomplish these goals.

In embodiments, the output of a speech-to-text API or system may be loaded into an editor, e.g., a standard editor that supports basic search functions. More advanced information retrieval techniques can also be used, such as the interfaces for web search. In embodiments, transcripts may be ranked based on similarity to a query, e.g., a set of phrases that a parent may be interested in. In embodiments, a speech-to-text output may be segmented, e.g., into paragraph-size sections, such that each section may be treated as a separate document or transcript. In embodiments, a keyword search, such as the ones discussed next, may be used to identify for inclusion and/or filter out substantive content from a transcript generated by the speech-to-text converter.

3. Keyword Search

The term "keyword" as used herein refers to any utterance associated with a sound wave and its representation, e.g., a tone produced by a person or machine (e.g., the beeping sound of an answering machine). As such, a keyword may or may not be associated with actual speech. In embodiments, a keyword may be detected within an audio signal, e.g., by analyzing the audio signal and identifying signatures that are correlated with certain keywords. In embodiments, a keyword may be detected among recognized words, e.g., words produced by a voice recognition program. Further, a keyword may be a searchable word in a transcript, e.g., a transcript generated from a recording such as audio file. In embodiments, the transcript may be generated from a speech-to-text engine that converts a digest file into text to enable an identification of labeled portions of the recording, e.g., via a keyword search in the text.

Accordingly, in embodiments, detection of a keyword may be accomplished by a search module that can process one or more types of data to identify keywords. It is noted that a speech-to-text service that has a keyword spotting feature, e.g., IBM® Speech to Text service, may be utilized to perform a basic keyword search. Embodiments of keyword spotting in audio that may be used are described in the commonly-owned application: U.S. patent application Ser. No. 15/688,221, filed on Aug. 28, 2017, entitled "CONVOLUTIONAL RECURRENT NEURAL NETWORKS FOR SMALL-FOOTPRINT KEYWORD SPOTTING," which is incorporated by reference herein in its entirety. Examples of methods for keyword searching in low resource languages, such as some Chinese dialects, are described in Li, G., Feng, J., Wang, J., Zhou, L.: Effective keyword search for valuable LCAs over XML documents. In: Conference on Information and Knowledge Management (CIKM), pp. 31-40 (2007), which is incorporated by reference herein in its entirety.

In embodiments, keywords that may be generated based on utterances by children with limited vocabulary, persons with limited speaking ability, or persons with heavy accents may be recognized as speech. In addition, in multi-party conversations or interactions, each person may be viewed as the originator of a keyword. In embodiments, one or more keywords may be pre-determined and user-programmable. It is understood, that any number of keywords, e.g., distinguished words, phrases, or sounds may be trained, e.g., using an acoustic or linguistic model that can detect subtle differences in utterances. In embodiments, users aware of the recording may speak keywords to set flags or marks for content inclusion or exclusion depending upon the keyword. For example, in embodiments, the smart speaker may detect the keyword using keyword spotting to set a maker or flag, which may be, for example, be correlated to a timestamp in the recording when the keyword was uttered. Then, in embodiments, the smart speaker system or other system may use the marker when generating the digest recording.

In embodiments, keywords may be ranked, e.g., according to priorities assigned to each keyword, and used as a parameter in identifying substantive content to be removed from a recording when generating a digest file that consolidates such content.

4. Random Sampling

In embodiments, recorded data, e.g., recorded data that has undergone one or more of the non-substantive content removal processes discussed in Section B above, may be randomly or pseudo-randomly selected to be sampled for removal (or non-removal) of certain substantive content in order to generate a digest file that may serve as a consolidated content of the original recording. It is understood that the consolidated content may be the result of any type of content reduction. For example, in embodiments, rather than generating a truly random sample or non-substantive content, a digest file and the amount of randomly or pseudo-randomly selected recorded speech contained therein may be tailored to comprise recorded speech that is selected based on an association with a particular speaker, event (e.g., music), time (e.g., a child's regular playtime), keyword, or any other combination of one or more parameters, such as a user-selected runtime.

Figure 5:
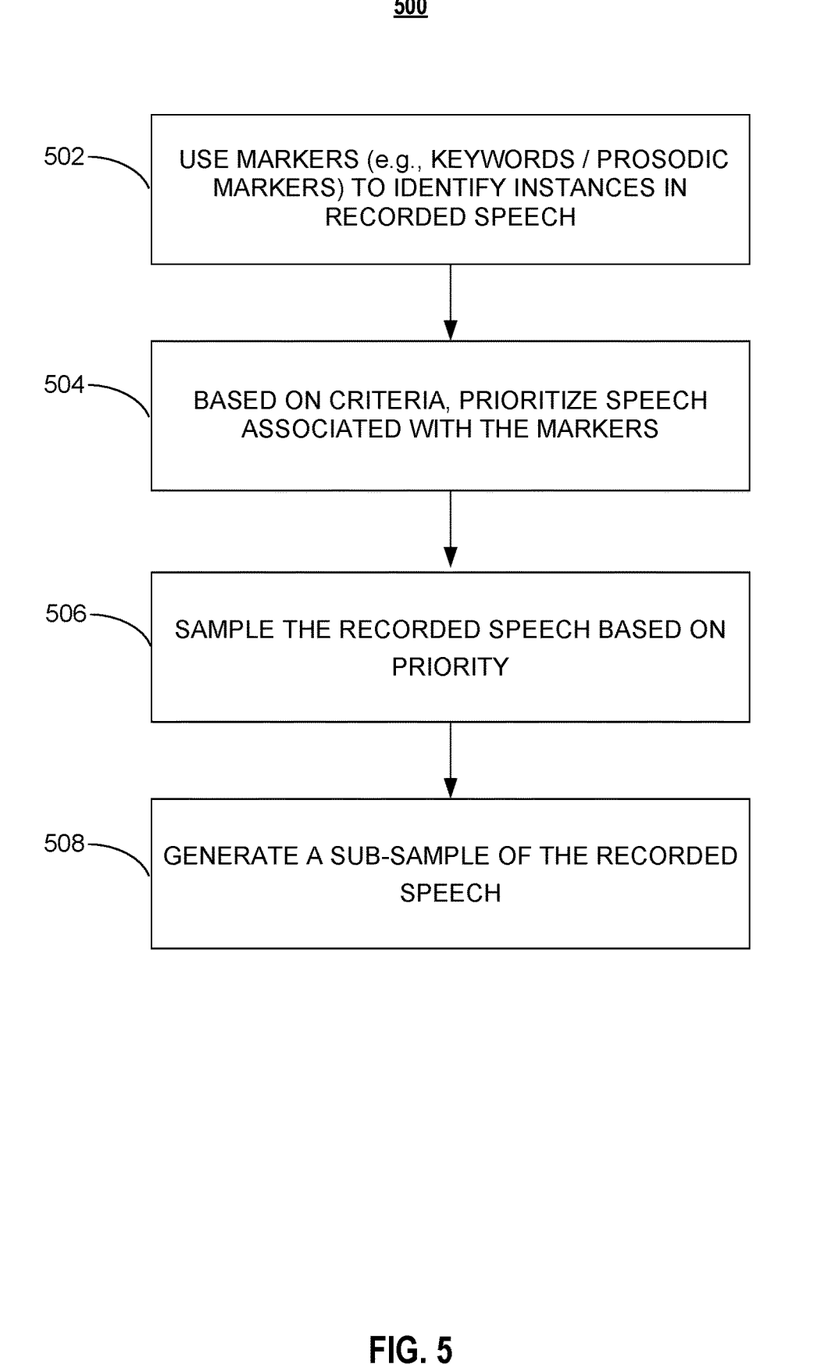
FIG. 5 is a flowchart of an illustrative process for random sampling according to various embodiments of the present disclosure.

FIG. 5 is a flowchart of an illustrative process for random sampling according to various embodiments of the present disclosure. Sampling process 500 begins when, in embodiments, keywords and/or prosodic markers are used (502) as content identifiers to identify and label, e.g., automatically, in recorded speech that comprises substantive content, instances of speech, such as emotional speech or other user-definable speech characteristics. Prosodic markers may be any unit of speech or prosodic clues as defined further below.

For example, in embodiments, speech comprising characteristics of emotion may be identified and categorized by detecting, time intervals in a recording that are based on, e.g., pitch (e.g., fundamental frequency $f_0$), energy (intensity), or other measurable characteristics. Those skilled in the art would know how to process a speech waveform associated with a recording to compute such characteristics, e.g., by using tools such as Praat. See, e.g., Boersma, Paul & Weenink, David (2018). Praat: doing phonetics by computer [Computer program]. Version 6.0.39, retrieved 3 Apr. 2018 from http://www.praat.org/), which is incorporated by reference herein in its entirety.

In embodiments, to compensate for or reduce the effects of variations and artifacts caused by, e.g., gender differences, distance between speaker and microphone, dialects, acoustic environment, and so on, in embodiments, machine learning techniques may be used to train a speech model that aids in correctly recognizing substantive content, such as emotional speech. For example, a standard corpus, such as Emotional Prosody Speech and Transcripts by the Linguistic Data Consortium, may be used as a benchmark to pre-train a suitable speech model. *Recognizing emotion in speech using neural networks* Keshi Dai et al., (Proceedings of the IASTED International Conference on Telehealth/Assistive Technologies, Apr. 16-18, 2008, Baltimore, Md.), which is incorporated by reference herein in its entirety, is an example of how machine learning may use such a corpus to detect emotional speech.

In embodiments, pseudo-random selection of speech comprising substantive content involves assigning a higher priority to events that comprise certain content, e.g., emotional speech, speech comprising certain keywords, etc., or events that that occur at a certain frequency when compared to speech of another type or frequency. In embodiments, at least some user-selectable, content-related parameters from a set of user-selectable content-related parameters and at least some labels of content type may be used to assign a priority to portions of a recording. As a result, certain types of speech or events may obtain a higher priority (504).

In embodiments, responsive to a digest duration not being less than a target duration, if the digest file includes all portions of the recording having a top priority, a secondary parameter may be used to select portions of the recording having a top priority to include in the digest file, such that the digest file has a digest duration less than or equal to the target duration, e.g., a user-selected runtime. The secondary parameter may comprise a duration, a user-identified nested priority, or a parameter for randomly selecting content and may be selected from the set of user-selectable content-related parameters. In embodiments, selected portions of a recording that have a top priority may be subportions that have been selected from one or more of the portions of the recording that have been assigned a priority In embodiments, in response to a frequency of events of one or more types exceeding a threshold within a predetermined time period, a portion of a recording associated with those events may be sampled (506) to generate (508) a sub-set of recorded speech that comprises substantive content of that type for inclusion in a digest file.

For example, in response to detecting a cluster of three instances of emotional speech within a time period of 10 seconds, each instance may be assigned a value based on a formula that assigns, e.g., 1 point to each first instance, 5 points to each second instance, and 20 points to each third instance that all occur within a time period of up to 15 seconds. In embodiments, any number of the instances may be grouped and marked as a single event that is assigned a collective rank based on the number of cumulative values. The rank may be compared, e.g., to ranks associated with similar events, such as three instances of emotional speech occurring within a time period of 1 minute that, based on the same formula, may be grouped into a cluster and assigned a lower cumulative value and, thus, a lower priority and rank. Then, speech that extends ("randomly") 15 seconds from the first instance to a time period extending 10 seconds after third instance of the event may be selected for inclusion in a digest file that, thus, captures at least some of the speech of interest (here, emotional speech).

In embodiments, a user-definable recording time may be used to limit the total amount of "randomly" captured substantive speech.

Alternatively, in embodiments, the selection of content may be completely random.

Finding Substantive Content Using Prosodic Clues and Other Markers

Figure 6:
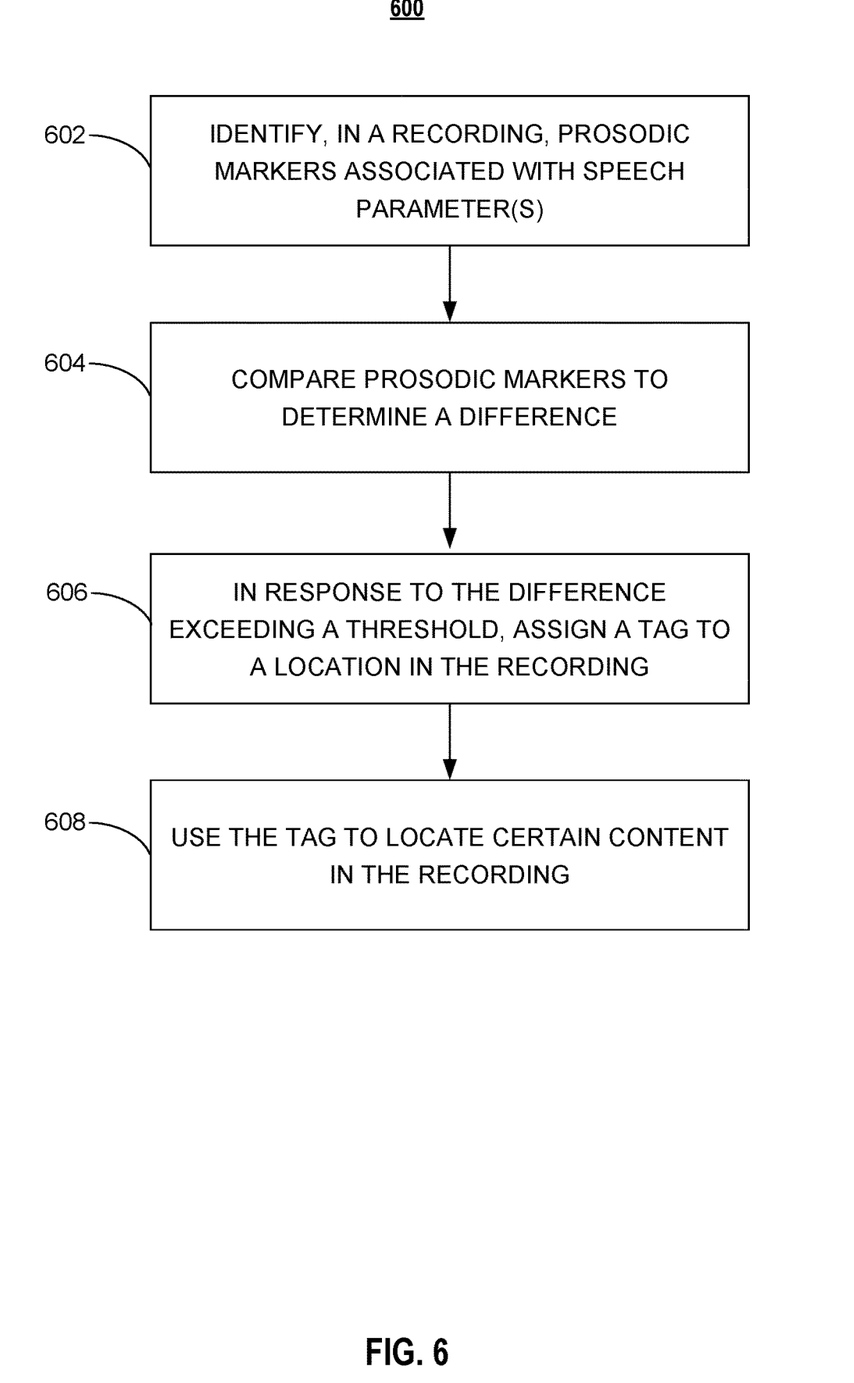
FIG. 6 is a flowchart of an illustrative process for locating content by using markers (e.g., signals, keywords, or other indicia), according to various embodiments of the present disclosure.

FIG. 6 is a flowchart of an illustrative process for locating content by using markers according to various embodiments of the present disclosure. In embodiments, process 600 begins when a recording is analyzed to identify (602) any number of prosodic markers that each may be associated with at least one speech parameter. A prosodic marker may comprise any unit and any characteristic of speech, e.g., energy, pitch, duration, rhythm, speed, volume, timing of words, and other non-vocabulary features of speech that may be used to define markers that may aid in estimating an emotional state of the speaker, e.g., emotional stress, that reflects on a speaker's state of mind or any other parameter associated with a speaker.

In embodiments, a marker may be compared (604) to marker(s) associated with a previous utterance in order to determine a difference in their characteristic. Then, in response to the difference exceeding (606) a threshold, a tag may be assigned to a location in the recording. In embodiments, the tag may then be used (608) to locate certain content, e.g., speech associated with a certain amount of emotion, in the recording that, as discussed previously, can be used to create a custom digest of a recording. It is understood that, in embodiments, spectral characteristics associated with prosodic markers may be derived from time-domain waveforms or frequency-domain spectrograms derived from such waveforms.

In embodiments, machine learning techniques may be used to not only learn relevant markers but also how to locate certain speech comprising substantive content based on user-preferences, e.g., by analyzing interactions between a user and a recording. As discussed next, machine learning techniques may also use diarization to identify speech associated with each of two or more speakers.

Diarization

For multi-party conversations comprising many turns, speaker diarization is a useful tool for identifying individual speakers, e.g., for inclusion into a transcript that may be generated by the methods discussed in Section C.2 above. In embodiments, a diarization module may be used to analyze a recording or data derived therefrom in order to determine a number of speaker turns associated with speech in a recording, e.g., by assigning markers to portions of speech deemed substantive content, and create a person-by-person transcription of the recording. The diarization module may use any existing speech-to-text service, e.g., IBM® Speech to Text service, that uses speech as input and outputs, e.g., text together with speaker labels that identify each speaker and their speech.

In addition, a turn parameter (e.g., distribution frequency) may be determined for a set of speaker turns. In embodiments, the diarization module may be used to determine whether, e.g., within a given time period, the number of turns in a distribution of turns exceeds a predetermined threshold. If so, such instance may be tagged as an event and, thus, be made a searchable keyword that may be used as a parameter, e.g., when removing substantive content from a recording to generate a digest file.

D. Providing a Summary to a Recipient

Once consolidated data has been generated, it may be provided in any format, e.g., to a consumer of a consolidated recording. For example, in embodiments, a recording that has been processed to remove non-substantive content, e.g., a recording that has been processed to filter out audio signals comprising periods of no recorded speech to generate compressed data, and certain substantive content, as described above, may be configured to be played back at a speed faster than it was originally recorded. In embodiments, playing back speech comprises adjusting the pitch of the sound such that it remains substantially the same as the pitch of the original recording at the time it was created. In embodiments, a speech synthesizer may be use to modify the played back record, such that a pitch is adjusted to a target pitch that equals the pitch of the original recording.

Because speech may be represented as the convolution of a source signal (e.g., a sinusoidal wave representing pitch) and a filter (e.g., a resonant filter), in embodiments, the filter may be adjusted while the pitch may be kept constant.

In addition, in embodiments, some parts of a recording, such as the duration of vowels may be adjusted to slow down (or speed up) so as to produce one or more desirable sound characteristics. As discussed previously, a user may be able to select a target runtime that is used to generate a digest file tailored to that runtime. It is understood that, prior to providing the digest file to the user, the file may be further compressed by using any compression method know in the art.

In embodiments, a user may be presented with a complete or partial transcript, e.g., generated by a speech-to-text API previously discussed, that highlights emotional speech, selected keywords, or any parameters). In embodiments, consolidated data may be presented graphically, e.g., using a timeline that indicates speech activity over time. In embodiments, speech activity may be visualized by using a histogram that illustrates syllable count over time. In embodiments, graphical representations illustrating plots of energy, pitch, etc., may be used to help a user to find speech characteristics, such as emotional speech associated with keywords and other markers. It is understood that hotkeys may be configured to make it easy to search for such speech characteristics.

Overall, the consolidated data generated by the systems and methods used herein increases the efficiency with which a user may extract relevant and valuable information from a recording without having to consume hours of recorded data.

E. Use Cases

Some psychological literature suggests that the amount of language that a child hears in early childhood development is a leading indicator for success later in life. Therefore, in embodiments, a syllable counter is employed to count the number of syllables in a recording that corresponds to what a child hears during the time of recording. The number of syllables counted during the recording may, thus, allow for an estimate of the average number of words a child hears throughout the day, such that corrective action may be taken, if so desired. In embodiments, a syllable counter may count syllables by measuring a number of inflections, i.e., peaks, detected in a recoding comprising speech.

It is understood that the process of counting syllables may be calibrated, e.g., to some ground truth by using a supervised model. In embodiments, a linear regression model may be used to perform the calibration that involves determining a correction parameter or factor based on a comparison of a known number of syllables in a given text, e.g., a book or chapter of a book, and a number of syllables obtained using the method of counting syllables from an audio file. In embodiments, an energy plotting program, such as Praat or similar tools may be utilized to implement the syllable counter.

For example, in embodiments, raw audio, i.e., an analog waveform that is a function of a microphone's displacement over time, may be processed, e.g., by digitizing the audio file to obtain a number of samples per second, each sample being, e.g., a two-byte quantity. Once the waveform is squared, it represents an energy contour. Low-pass filtering may be used to smooth the energy contour, such that peaks and valleys may be counted, e.g., by counting the zero-crossings of the first derivative of the smoothed-out waveform.

In embodiments, once the word count drops below a predetermined threshold number for a certain time period, e.g., a week, parents may be automatically notified, e.g., by the system shown in FIG. 7.

In embodiments, the system may provide various metrics to users, which may be used for a variety of purposes. For example, one or more metrics, such as amount of conversation of a young child, extracted from the recording may be sent to a smartphone or other mobile device of a parent. Furthermore, these metrics may be used to create competitions among families to see who talks to their children the most. The system could send parents a report on which of child is talking the most and with whom children are interacting.

In addition to families who may take advantage of the present disclosure, various embodiments disclosed herein may be used in other applications to consolidate speech, e.g., speech recorded during conferences, meetings, and other events. For example, a user interested in a certain topic at a conference may provide (e.g., select from a user-interface) any number of keywords to be used to filter out likely relevant speech in order to generate a digest of one or more conference talks to limit the amount of information to a specific topic of interest. Similarly, a recording at a business meeting or similar environment may be tagged and filtered using keywords, such as names, dates, or other criteria to save time, e.g., when searching for specific names and specific action items associated with that name.

It is noted that any combination of consolidated speech and text may be created. For example, a digest file may be accompanied by a transcript that highlights or summarizes keywords and/or sentences or paragraphs comprising keywords to provide visual guidance that allows a user to consume information in a much shorter time than would otherwise be possible.

F. System Embodiments

FIG. 7 illustrates an exemplary system for consolidating the contents of a recording according to various embodiments of the present disclosure. System 700 may comprise recording device(s) 702-706, playback device(s) 712-716, audio/video processing device(s), public/private cloud(s) 708-710, and access to users for connecting, e.g., to a private cloud to browse upload or consume uploaded audio/video files. It is noted that any component or sub-component of system 700 may comprise any component or sub-component of system 800 shown in FIG. 8.

A recording device (e.g., 702) in FIG. 7 may be, e.g., an MP3 player, security system, and/or smart speaker system that has recording capabilities and, in embodiments, networking capabilities (e.g., Xiaoyu Zaijia by Baidu) that allow the smart speaker to connect to a (remote) server coupled to network (e.g., to access networked cloud 708 and/or server 710). In embodiments, recording device 702-706 may be camera, e.g., a web camera or a security camera that captures audio and video signals, or any other audio/video processing device. Similarly, playback device 712-716 may be any audio/video processing device, e.g., a smart phone. In embodiments, any number of networked recording devices 702-706 and playback devices 712-716 may be strategically positioned in an area such as a living space or office space to capture as much speech and other real-time events as possible that occur within a capture area of one or more devices.

In operation, one or more of the methods described herein may be performed by a recording device 702-706, a playback device 712-716, a server or any combination thereof. For example, an audio/video processing device that has been implemented into recording device 702-706 may be used to record an audio file, remove silence therefrom, and upload a digest file to the virtual family server that may further processes the digest file to remove (or select) certain content that then can be used by playback device 712-716. One skilled in the art will appreciate that by performing as much as possible of the data processing, e.g., silence/content removal at the front end, e.g., at a time a recording is made, will aid in reducing bandwidth requirements for system 700. In addition, an upload process may comprise data compression on the digest file to further reduce network bandwidth requirements.

It is understood that any security tools and mechanisms known in the art may be used to protect data that is created, stored, or transferred, e.g., to permit access only to authorized users. In embodiments, a recipient of a digest file may access, e.g., via cloud system 708, a database to review and search uploaded audio/video files, e.g., by using a keyword search. In embodiments, the recipient may set preferences according to which an audio/video processing device processes data, e.g., when generating the digest file for consumption or further processing by the recipient.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output devices, such as a speaker, a microphone, a camera, a keyboard, a mouse, touchscreen and/or a video display. The information handling system may also include one or more buses operable to transmit communications between the various hardware components.

Figure 8:
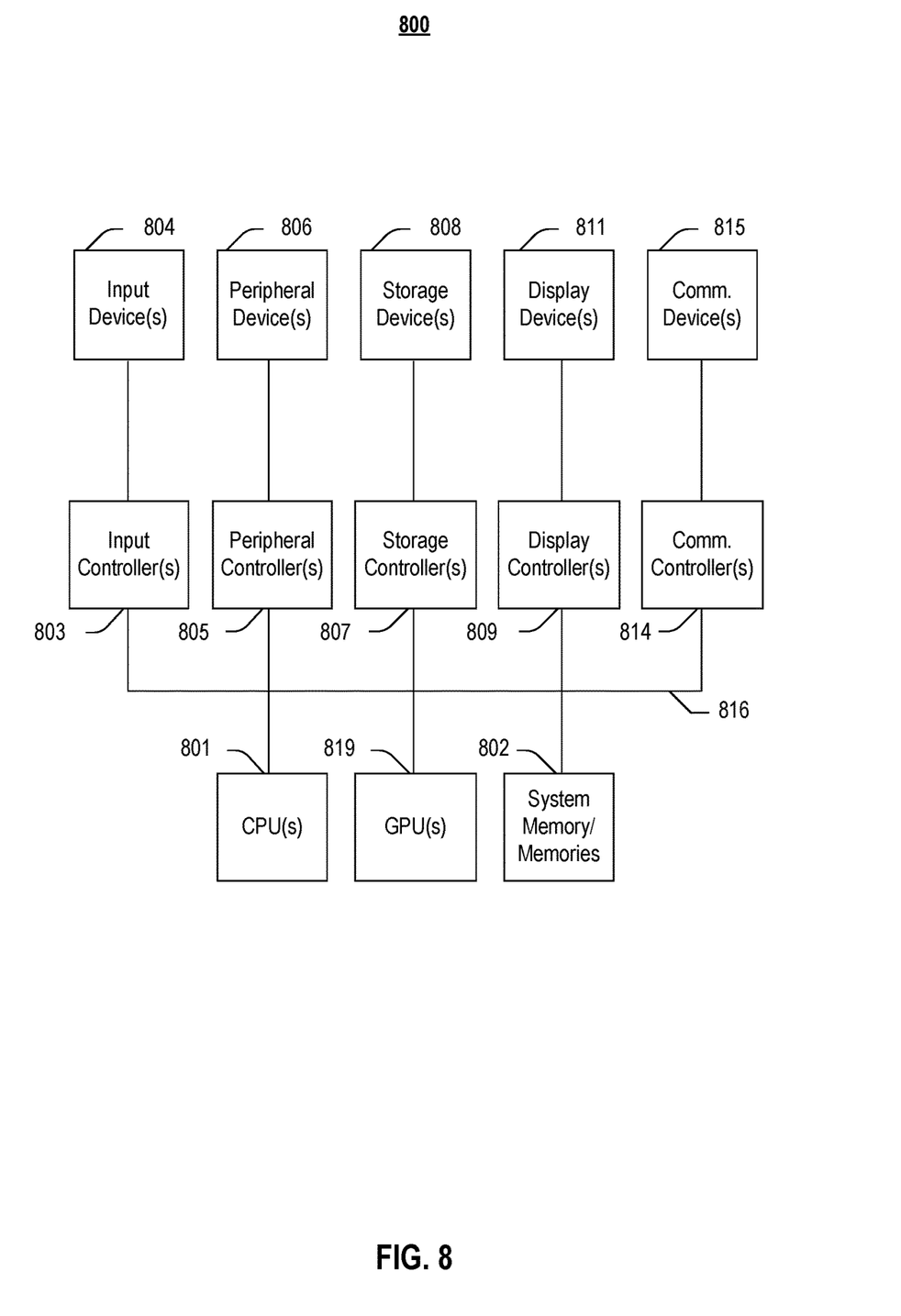
FIG. 8 depicts a simplified block diagram of a computing device/information handling system, in accordance with embodiments of the present disclosure.

FIG. 8 depicts a simplified block diagram of a computing device/information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. The system 800 may also include a display controller 809 for providing an interface to a display device 811, which may be a cathode ray tube, a thin film transistor display, organic light-emitting diode, electroluminescent panel, plasma panel, or other type of display. The computing system 800 may also include one or more peripheral controllers or interfaces 805 for one or more peripherals. Example of peripheral may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, an Fiber Channel over Ethernet/Data Center Bridging cloud, etc.), a local area network, a wide area network, a storage area network, or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for producing a digest of a multimedia file, the method comprising:
   receiving a recording having a first duration, the recording being made using at least one recording device to capture real-time events occurring within a recording capture area of the at least one recording device;
   receiving a set of user-selectable content-related parameters;
   applying a plurality of automated content identifiers to identify and label portions of the recording with at least one content type, in which at least some portions of the recording are labeled as non-substantive content;
   generating a digest file of the recording having a digest duration that is equal to or less than a target duration that is less than the first duration, by performing steps comprising:
      not including in the digest file portions of the recording labeled as non-substantive content;
      using at least some of the user-selectable content-related parameters from the set of user-selectable content-related parameters and at least some of the labels of content type to assign a priority to at least some of the portions of the recording;
      responsive to the digest duration not being less than the target duration, if the digest file includes all portions of the recording having a top priority, using at least one secondary parameter to select portions of the recording having a top priority to include in the digest file so that the digest file has a digest duration less than the target duration; and
      responsive to the digest duration being less than or equal to the target duration, supplying the digest file to a recipient.

2. The method according to claim 1, wherein not including in the digest file portions of the recording labeled as non-substantive content comprises removing non-substantive content from the recording, wherein removing comprises removing, at a time the recording is made, at least some of the recording that is deemed silence based on identifying signals as being below a threshold value.

3. The method according to claim 1, wherein the at least one secondary parameter comprises a duration, a user-identified nested priority, or a parameter for randomly selecting content, the at least one secondary parameter being selected from the set of user-selectable content-related parameters.

4. The method according to claim 1, wherein the selected portions of the recording that have a top priority are sub-portions that have been selected from one or more of the portions of the recording that have been assigned a priority.

5. The method according to claim 1, wherein at least one automated content identifier uses a parameter related to at least one of energy, pitch, duration, rhythm, speed, volume, or timing of words when identifying and labeling at least some portions of the recording as having a content type associated with at least one of a speaker, a location, silence, or an environmental parameter.

6. The method according to claim 5, wherein the parameter comprises a prosodic marker that is used to label at least some portions of the substantive content, the prosodic marker being derived from at least one of a time-domain waveform or a frequency-domain spectrogram that has been derived from a time-domain waveform.

7. The method according to claim 1, further comprising using a speech-to-text engine to convert the digest file into text to enable an identification of at least some of the labeled portions of the recording via a keyword search in the text.

8. The method according to claim 1, wherein supplying the digest file to the recipient comprises adjusting a pitch when the digest file is played back at an increased speed.

9. The method according to claim 1, further comprising, in response to determining that the substantive content comprises speech by two or more speakers, assigning markers to portions of the substantive content, the markers indicating speaker turns that identify speech associated with each of the two or more speakers.

10. A method for consolidating contents of a recording, the method comprising:
    receiving a recording comprising audio signals, video signals, or both;
    identifying and labeling portions of the recording that comprise one or more types of speech, each type of speech being associated with a set of events associated with at least one of a speaker, a location, or an environmental parameter;
    grouping the labeled portions of the recording into clusters of speech, each cluster of speech being associated with at least one event from the set of events;
    based on a set of criteria, applying priorities to at least some of the clusters of speech;
    using the priorities to generate a digest file of the recording, the digest file comprising one or more clusters of speech, wherein using the priorities comprises, for at least one priority, sampling one or more of the clusters of speech to generate one or more subsamples to be included in the digest file; and
    providing the digest file to a recipient.

11. The method according to claim 10, wherein labeling portions of the recording comprises, in response to a difference between two or more of markers exceeding a threshold, tagging a location in a portion of the recording with a marker that identifies a location in the portion of the recording as substantive content.

12. The method according to claim 10, further comprising, in response to identifying portions of the recording as non-substantive content, removing, at a time the recording is made, from the recording at least some of the recording that has been deemed silence based on signals that have been identified as being below a threshold value.

13. The method according to claim 10, wherein identifying portions of the recording comprises identifying speaker turns that identify speech associated with each of two or more speakers.

14. The method according to claim 13, further comprising using a speech-to-text engine to create a transcript of the recording that indicates speaker turns by the two or more speakers.

15. The method according to claim 13, further comprising applying one or more machine learning techniques to the recording to train a speech model to identify the portions of the recording, the one or more machine learning techniques using a diarization module to identify speech associated with each of two or more speakers.

16. The method according to claim 10, further comprising, in a post-processing step, comprising using a speech-to-text engine to convert the digest file into text to enable an identification of at least some of the labeled portions of the recording via a keyword search in the text.

17. The method according to claim 10, wherein identifying portions of the recording comprises using a speech characteristic that comprises at least one of energy, pitch, duration, rhythm, speed, volume, or timing of words that is used to identify emotional speech within the identified portions of the recording.

18. The method according to claim 17, wherein the speech characteristic has been derived from at least one of a time-domain waveform or a frequency-domain spectrogram that has been derived from a time-domain waveform.

19. A system for consolidating contents of a recording, the system comprising:
   a processor; and
   a non-transitory computer-readable medium comprising instructions that, when executed by the processor, cause steps to be performed, the steps comprising:
      receiving a recording comprising recorded speech, the recording comprising audio signals, video signals, or both that represent content, having a first duration, and being made using at least one recording device to capture real-time events occurring within a recording capture area of the at least one recording device;
      receiving a set of user-selectable content-related parameters;
      applying a plurality of automated content identifiers to identify and label portions of the recording with at least one content type, in which at least some portions of the recording are labeled as non-substantive content;
      generating a digest file of the recording having a digest duration shorter than or equal to a target duration that is less than the first duration, by performing steps comprising:
         not including in the digest file at least some of the non-substantive content;
         using at least some of the user-selectable content-related parameters from the set of user-selectable content-related parameters and at least some of the labeled portions of the recording to assign a priority to at least some of the portions of the recording;
         responsive to the digest duration not being less than the target duration, if the digest file includes all portions of the recording having a top priority, using at least one secondary parameter to select portions of the recording having a top priority to include in the digest file so that the digest file has a digest duration less than the target duration; and
         responsive to the digest duration being less than or equal to the target duration, supplying the digest file to a recipient; and
      providing at least some parts of the digest file to one or more recipients.

20. The system according to claim 19, wherein at least one automated content identifier uses a parameter related to at least one of energy, pitch, duration, rhythm, speed, volume, or timing of words when identifying and labeling at least some portions of the recording as having a content type associated with at least one of a speaker, a location, silence, or an environmental parameter.

* * * * *